April 24, 1962 W. VUTZ ET AL 3,030,875
HAY BALER

Original Filed Dec. 21, 1956 6 Sheets-Sheet 1

INVENTORS
Wilhelm Vutz +
Alexander A. Mittenbergs
BY Joseph Allen Brown
ATTORNEY April 24, 1962 W. VUTZ ET AL 3,030,875
HAY BALER
Original Filed Dec. 21, 1956 6 Sheets-Sheet 2

INVENTORS
Wilhelm Vutz +
Alexander A. Miftenbergs
BY Joseph Allen Brown
ATTORNEY

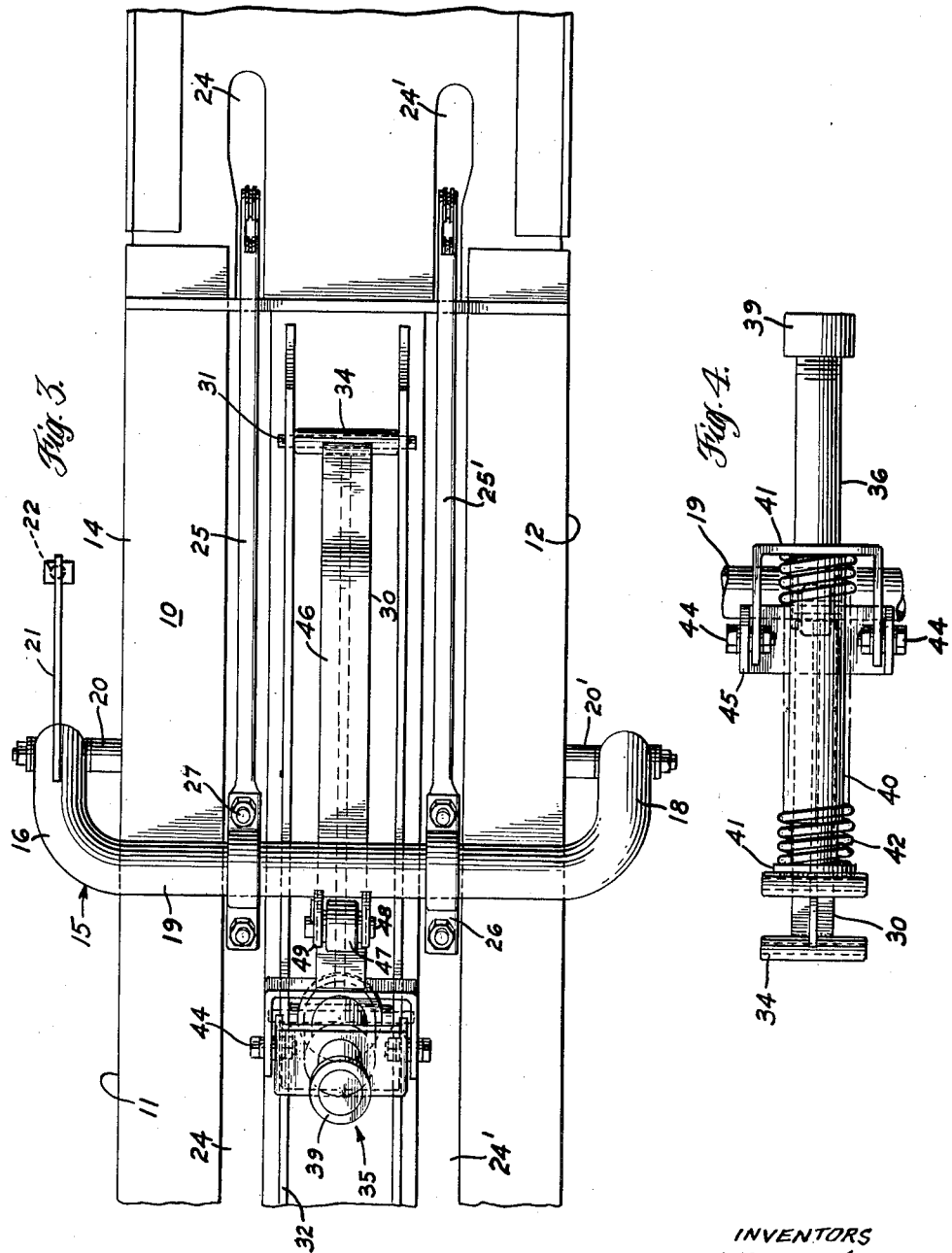

April 24, 1962 W. VUTZ ET AL 3,030,875
HAY BALER
Original Filed Dec. 21, 1956 6 Sheets-Sheet 4
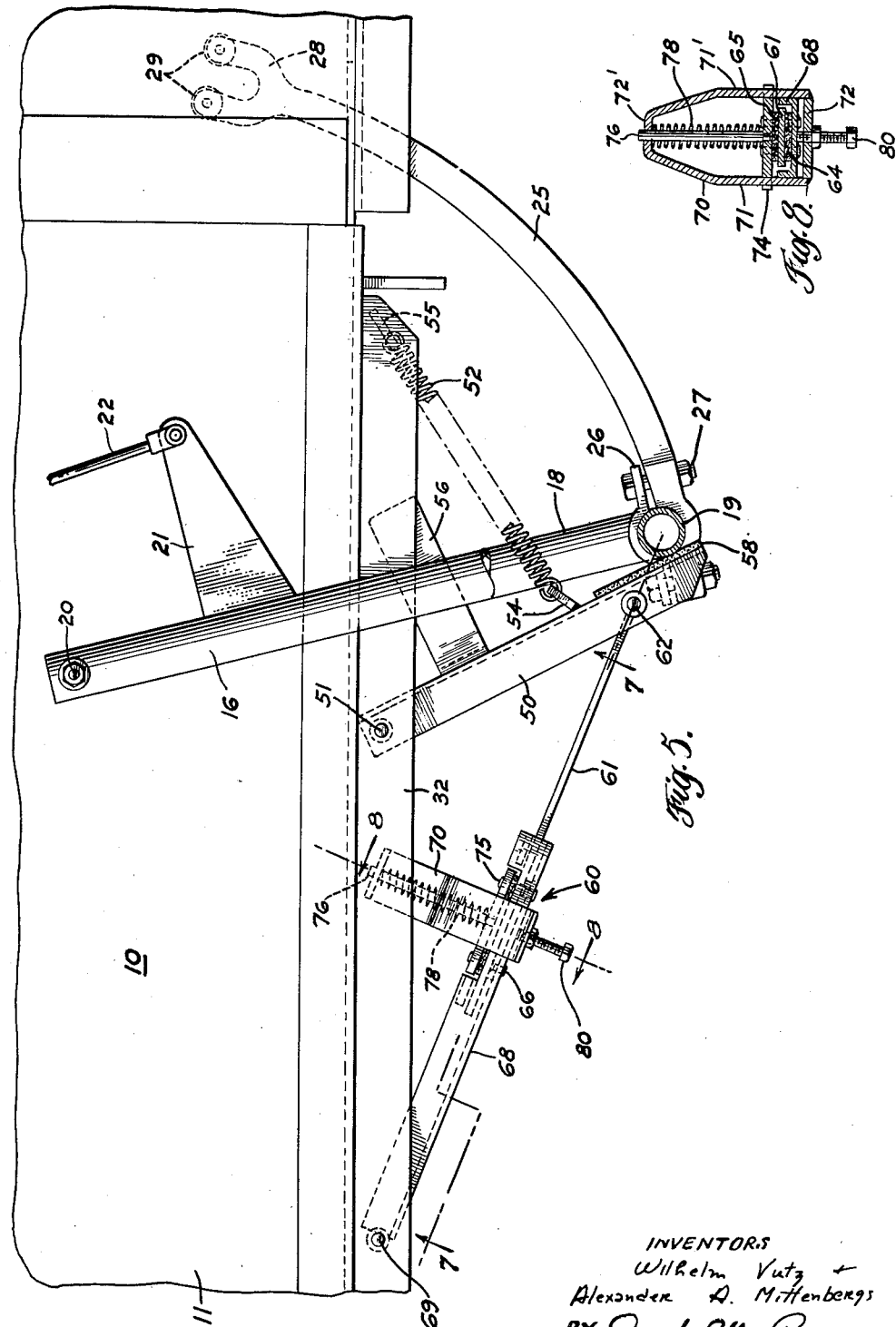

April 24, 1962   W. VUTZ ET AL   3,030,875
HAY BALER
Original Filed Dec. 21, 1956   6 Sheets-Sheet 5
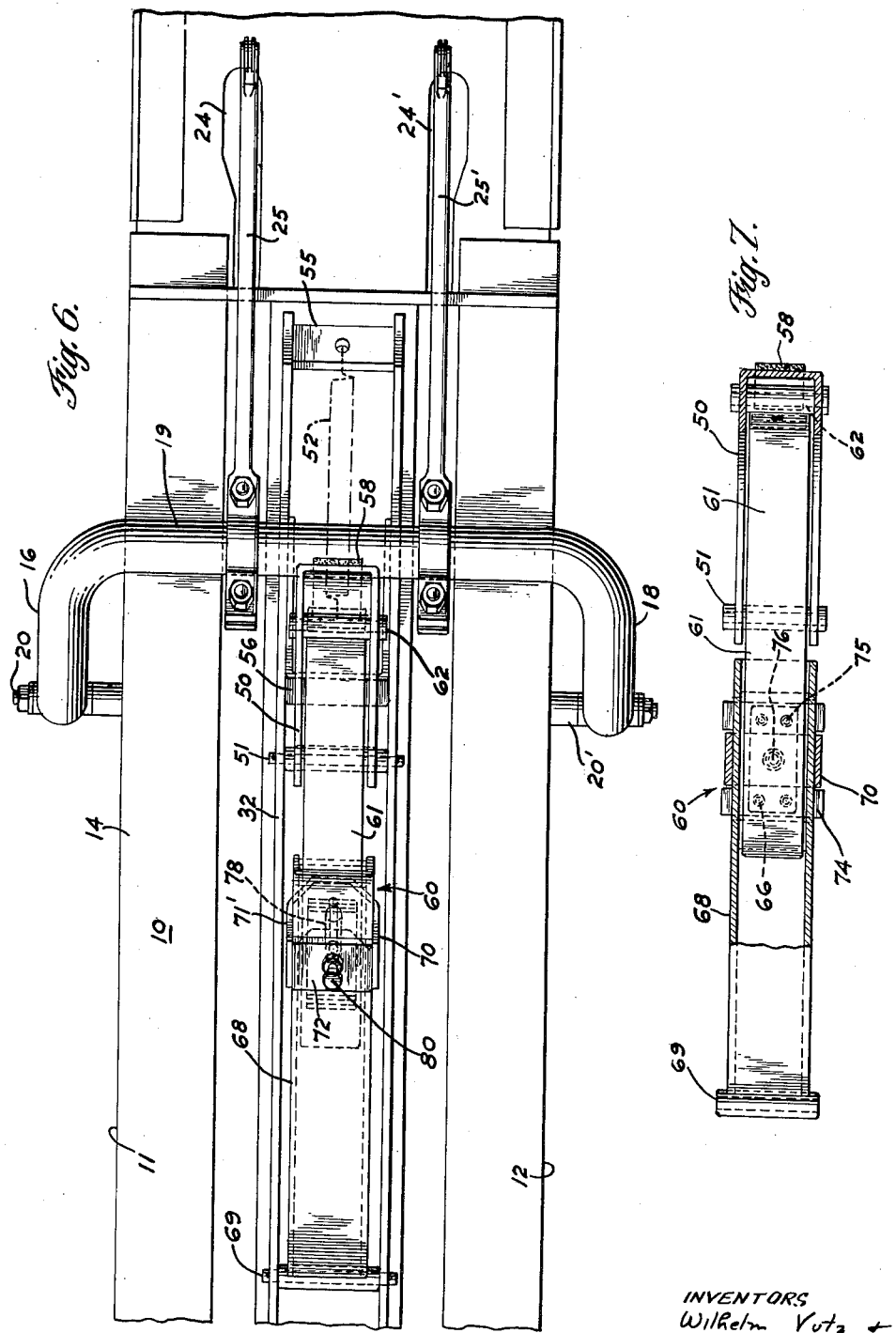
INVENTORS
Wilhelm Vutz +
Alexander A. Mittenbergs
BY Joseph Allen Brown
ATTORNEY

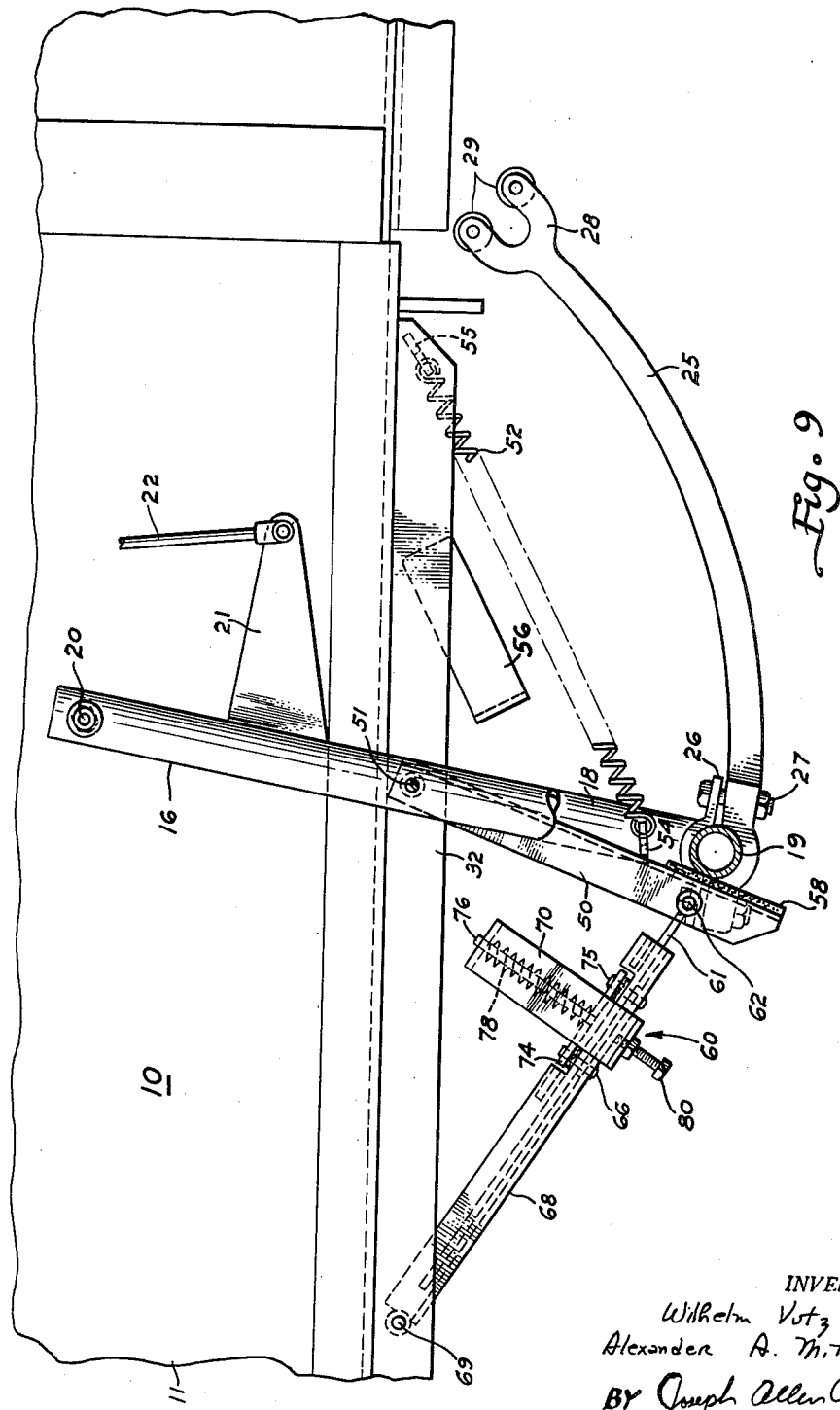

United States Patent Office 3,030,875
Patented Apr. 24, 1962

3,030,875
HAY BALER
Wilhelm Vutz, New Holland, Pa., and Alexander A. Mittenbergs, Columbus, Ohio, assignors to Sperry Rand Corporation, New Holland, Pa., a corporation of Delaware
Original application Dec. 21, 1956, Ser. No. 629,993, now Patent No. 2,897,749, dated Aug. 4, 1959. Divided and this application July 16, 1958, Ser. No. 748,969
4 Claims. (Cl. 100—19)

This application is a division of my parent application Serial No. 629,993, filed December 21, 1956, which issued as Patent No. 2,897,749. The invention relates generally to automatic hay balers, and more particularly to a braking device for a baler needle yoke. Still more specifically, the invention relates to a braking device particularly adapted for use in balers of the well known type in which the needle yoke is driven by a mechanism which includes a clutch which permits the needle yoke to overrun the drive, as shown, for example, in Nolt, U.S. Patent No. 2,750,877, issued June 19, 1956.

The baler in Patent No. 2,750,877 is adapted to be towed across a field of windrowed hay. It has a pick-up mechanism which elevates the hay and feeds it into a rectangular bale chamber where the hay is compressed into bales. At the start of each bale, a pair of wires project within the bale case, from one side of the case to the other. A free end of each wire, commonly known as the No. 1 wire, is clamped at one side of the bale case. The opposite end of each wire extends to a supply spool at the opposite side of the case. As the bale takes shape, it is pushed deeper into the bale case with each succeeding wad of hay and wire is reeled from the supply spools whereby the projecting wires are extended around the rear and two sides of the bale. Upon completion of the bale, a trip mechanism actuates a needle mechanism which oscillates, projecting the wires through the bale case, around the front of the bale and into a tier mechanism, after which the needles are retracted to starting position. The loop of each wire projected across the bale case is cut and clamped one strand of the loop providing a clamped free end positioned for the formation of the next bale. The other strand of the projected loop is twisted with its associated No. 1 free end to thereby form a band around the completed bale.

When the needles move on a working stroke, that is, delivering the wires to the tier, they are braked by the resistance of the wires as they come from the supply spools. However, on the return of the needles to starting position, there is no inherent means in the baler apparatus to brake them. The tying cycle in a baler is short; and, the needles travel at considerable velocity, particularly on their return strokes. After reaching maximum velocity, as they return, the needles and the yoke on which they are carried have a tendency to keep this velocity because of inertia. The needle yoke mechanism has a tendency to overrun the clutch, arriving at the end of a return stroke at high speed. This creates high impact loads in the needle yoke mechanism and in the means which drives it, thereby increasing wear and producing other undesirable results.

The primary object of this invention is to provide an improved device, in a baler of the character described, for braking or cushioning the needle yoke mechanism on each return stroke to thereby minimize impact loads.

Another object of this invention is to provide a needle yoke braking device which initially becomes effective in its braking action when the needle yoke is traveling substantially at its highest velocity.

Another object of this invention is to provide, in a braking device of the character described, means for progressively increasing the braking action as the needle yoke mechanism moves from said point of highest velocity towards the end of a return stroke.

Another object of this invention is to provide a needle yoke braking device which includes means which stores energy on each return stroke of the needle yoke, such stored energy operating to aid the mechanism for driving the needle yoke in overcoming inertia each time the needle yoke starts on a working stroke.

Still anothr object of this invention is to provide means for adjusting the braking action of the braking device.

A further object of this invention is to provide a braking device having novel adjustable friction means for increasing or decreasing the braking action of the device.

A still further object of this invention is to provide a braking device having adjustable limit or stop means.

Other objects of this invention will be apparent hereinafter from the specification and from the recital in the appended claims.

In the drawings:

FIG. 3 is a side view of FIG. 1;

FIG. 4 is a side elevation of the braking device looking from the line 4—4 of FIG. 1 in the direction of the arrows;

FIG. 5 is a plan view similar to FIG. 2 showing a needle mechanism during a return stroke as it engages a braking device constructed according to another embodiment of this invention. A portion of the needle yoke is broken away, as in FIG. 2, to better illustrate the engagement of the yoke with the brake;

FIG. 6 is a side view of FIG. 5;

FIG. 7 is a section taken on the line 7—7 of FIG. 5 and looking in the direction of the arrows;

FIG. 8 is a section taken on the line 8—8 of FIG. 5 looking in the direction of the arrows;

Figure 1:
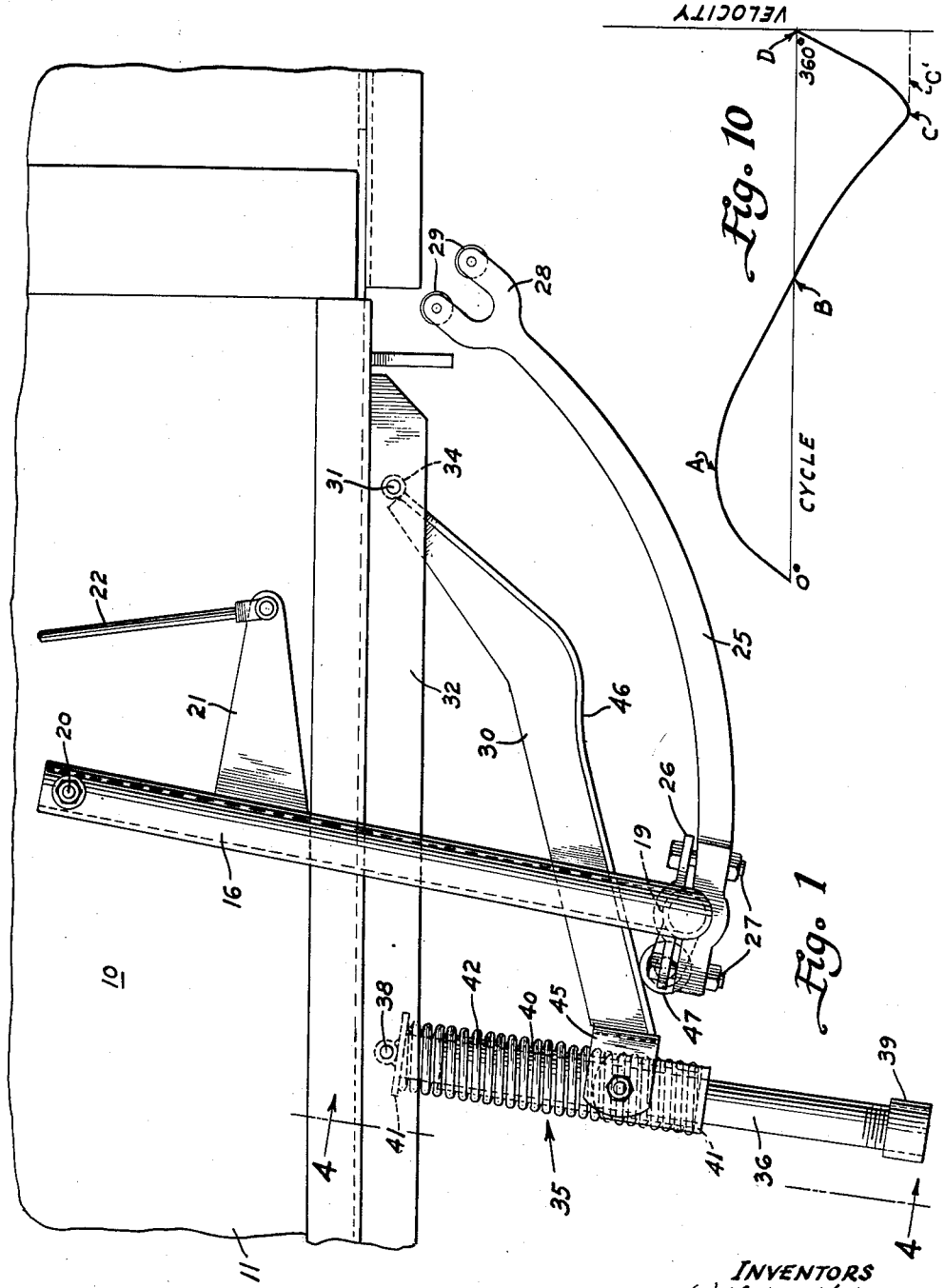
FIG. 1 is a fragmentary plan view of a bale case and a needle mechanism in at-rest position, there being shown associated with the needle mechanism a braking device constructed according to one embodiment of this invention.
Figure 2:
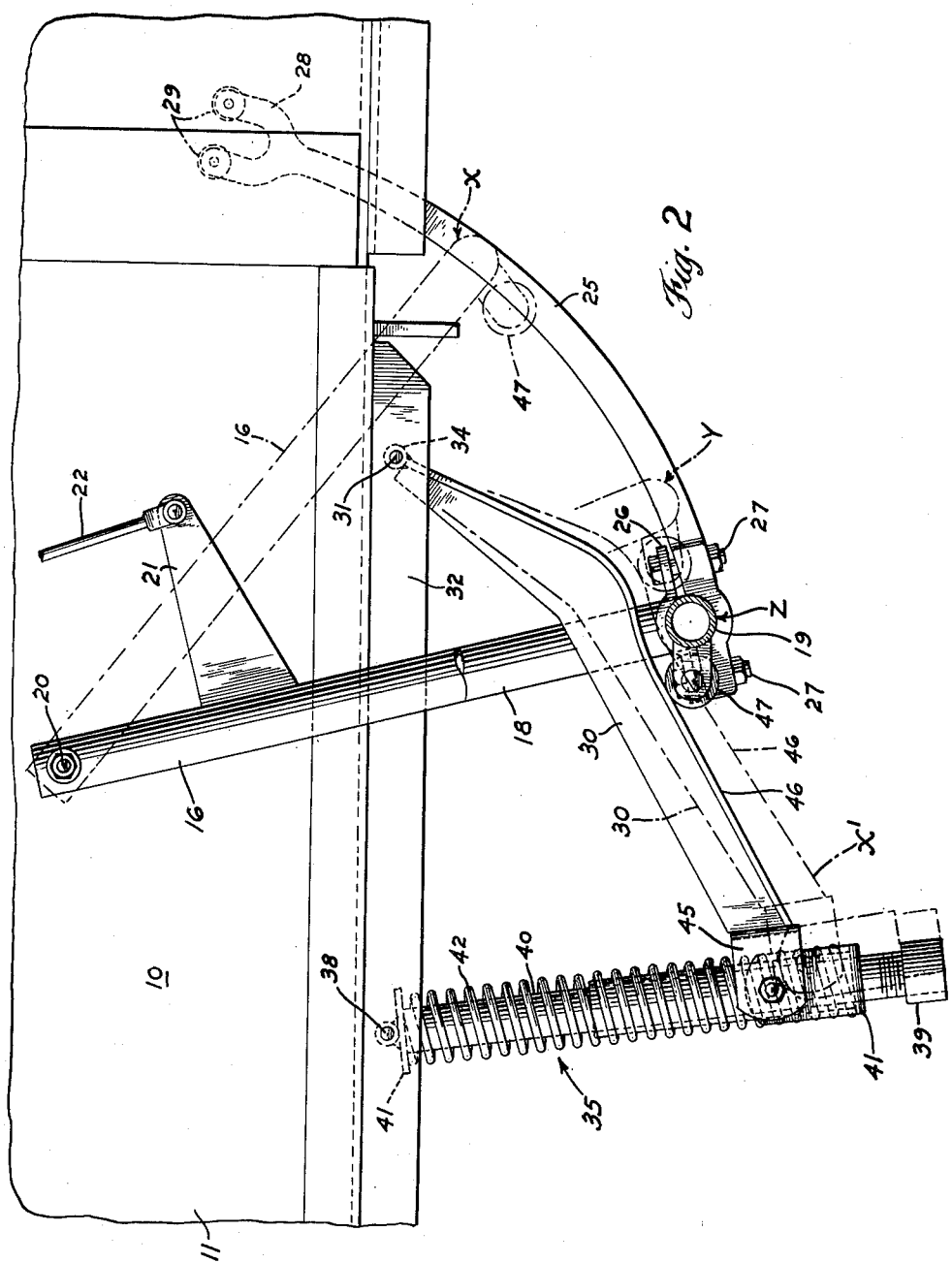
FIG. 2 is a plan view similar to FIG. 1 showing in solid lines the needle mechanism in an intermediate position of a return stroke and illustrating in dotted lines other relative positions of the needle mechanism. Part of the needle yoke is broken away to show the means on the yoke engageable with the braking device.

FIG. 9 is a fragmentary plan view similar to FIG. 5 showing the needle yoke mechanism in retracted position and the braking device operative; and, FIG. 10 graphically illustrates the velocity of the needle mechanism during a working and return stroke, the operation of the needle mechanism over one complete cycle being indicated 360°, the velocity of the yoke on a working stroke being indicated above the cycle line and on a return stroke below the line.

Referring now to the drawings by numerals of reference, and first to the embodiment of the invention shown in FIGS. 1-4, inclusive, 10 denotes generally a bale case which is rectangular in cross-section. The bale case includes a top wall 11, a bottom wall 12, and a side wall 14. The remaining side of the bale case is not shown.

Straddling bale case 10 is a needle yoke 15 having legs 16 and 18 which extend along the top and bottom walls, respectively, of the case. These legs are connected by a bight 19 which extends generally parallel to side wall 14. The ends of legs 16 and 18 are supported on coaxial pivot pins 20—20' about which the yoke is adapted to be oscillated.

Yoke 15 is oscillated by means of a crank arm 21 welded to leg 16. Crank arm 21 is connected by means of a drag link 22 to a drive mechanism, not shown, but similar to that employed in Patent No. 2,750,877 heretofore mentioned.

The side 14 of bale case 10 has a pair of spaced, parallel, longitudinal elongated slots 24—24'. Spacedly mounted on a bight 19 of yoke 15 and in alignment with these slots are arcuate needles 25—25'. Each needle is fastened at one end to yoke 15 by a bracket 26 and bolt nut means 27. The opposite end 28 of each needle is bifurcated, each branch of the bifurcation carrying a roller 29 at its outer end grooved peripherally.

The needle mechanism operates in conventional fashion to deliver wires at the side 14 of the bale case to the opposite side of the case when a bale is completed, it being understood, of course, that the side of the bale case not shown has slots to permit the passage of the needles. The grooved rollers 29 on the needles engage the wires when the needles are projected, each associated pair of spaced rollers delivering a wire bight to the tier at the opposite side of the case.

Referring now to FIG. 10, there is graphically illustrated the velocities of the needle mechanism during a working and return stroke. From a zero degree position (FIG. 1) the needles move on a working stroke at a gradually increased velocity until a peak point A is reached. From there, until the wires are delivered to the twister, the velocity decreases. As previously stated, the resistance offered by the wires as they are reeled from the supply spools tends to brake the needle movement on a working stroke. However, once the wires have been delivered and the needles start back, this resistance is not available. After delivery point B is reached, the needles move back at considerable speed, a peak velocity being attained at approximately point C. At point C the velocity is substantially greater than the peak velocity A reached on the working stroke. Further, it will be noted that the needles have only a short interval between point C and point D, or 360°, the dead end of the return stroke. It has been found that the needle yoke will be traveling at substantially velocity C when it reaches point D unless braked, as denoted by line C'. The improved brake means of this application is designed to apply braking force to the needle yoke at a point approximate to point C and from there to point D, so that when the yoke reaches D, kinetic energy will have been substantially eliminated.

The brake comprises a lever 30 which is generally T-shaped in cross-section. The lever extends angularly outwardly relative to the bale case, having one end pivotally connected by a pin 31 to spaced ribs 32 on side wall 14. Pin 31 extends through a sleeve 34 welded to the lever. The opposite end of lever 30 is urged away from the side of the bale case by biasing means 35. Such biasing means comprises a rod or tubular member 36 pivotally connected at one end 38 to ribs 32, and having an adjustable stop or cap 39 threaded on its opposite end. Slidable on member 36 is a sleeve 40 having an integral inverted forked end 41, such forked end being engageable with stop 39. Member 36 has an annular flange or pad 41 at its pivoted end; and, interposed between this flange and the end 41 of lever 40 and surrounding the sleeve 40 and member 36 is a coil-spring 42. Lever 30 is pivotally connected at 44 to the forked end of the sleeve by means of a U-shaped bracket 45 welded or otherwise affixed to the end of the lever.

As shown best in FIG. 3, the brake device is positioned on the side 14 of bale case 10 between top and bottom walls 11 and 12. Lever 30 has a cam face 46 disposed for engagement by a roller 47 rotatable on the pin 48 carried by brackets 49 welded to the portion of bight 19 between the needles 25—25'.

In operation, when the yoke starts on a working stroke, it rotates counterclockwise from the position shown in FIG. 1. The end of the working stroke is indicated by dotted position X, FIG. 2. At this point, the needles project across the bale case and the bifurcated ends 28 extend through the opposite side of the bale case, the wire bights delivered by the needles being picked up by the tying mechanism.

When the needle yoke moves on a working stroke, spring 42 expands, and the end 41 of sleeve 40 is moved along member 36 until it engages stop 39. The axial movement of the sleeve causes lever 30 to pivot about 31 and member 36 to pivot about 38, the parts assuming the dotted position X', FIG. 2.

The brake device is in position X' (FIG. 2) when it is engaged by the needle yoke on its return stroke, the position of the yoke when it engages the lever being denoted Y. The roller 47 engages the face of lever 30 tangentially, or substantially so, thereby minimizing the impact loads created when the needle yoke engages the brake lever. At point Y, the needle yoke is traveling at substantially its highest velocity (point C, FIG. 10), or just slightly before it reaches such peak point. As the needle yoke moves from Y to its at-rest position, as shown in FIG. 1, roller 47 rolls along the face 46 of lever 30 causing the lever to pivot and spring 42 to be compressed. Spring 42 absorbs the kinetic energy of the needle yoke whereby when the yoke reaches the dead end of its stroke, the impact loads are substantially eliminated.

The angular extension of lever 30 relative to the bale case when the yoke is in position X, may be regulated by adjustment of cap 39. This may be done to insure that the lever is disposed in optimum position for engagement by the roller 47 with a minimum amount of impact.

Referring now to the embodiment of the invention shown in FIGS. 5–9, wherein parts similar to the parts described in connection with the first embodiment of the invention bear like numerals, the brake as modified comprises a lever or channel 50 pivotally connected at 51 to ribs 32. Lever 50 is biased in a counterclockwise direction (FIG. 5) by a spring 52 connected at one end to a bracket 54 fixed adjacent the free end of the lever and at its opposite end to a bracket 55 welded to the side 14 of bale case 10 intermediate ribs 32. The counterclockwise pivoting of lever 50 is limited by a stop member 56 affixed to bale case and extending angularly relative thereto. Affixed to lever 50 between the free end of the lever and bracket 54 is a friction facing 58 of any desired brake material.

As with the first embodiment of the invention, lever 50 is disposed to be engaged by the needle yoke on a return stroke at a point approximate to the peak velocity of the yoke. When engaged by the bight 19 of the yoke, lever 50 is pivoted against the resistance of spring 52 and kinetic energy is absorbed. Moreover, the pivot 51 of lever 50 is so disposed relative to the arc of the needle yoke that bight 19 moves relative to brake face 58 as the parts move from the position shown in FIG. 5 to the position shown in FIG. 9. The movement of bight 19 along brake surface 58 acts as a further dampener. Still further, face 58 is made of a material having some resiliency to thereby serve as a cushion so that when the bight of the needle yoke engages the lever, the shock loads will be reduced.

When the needle yoke is at rest, FIG. 9, spring 52 is extended. As soon as the yoke starts on a working stroke, lever 50 begins to pivot counterclockwise. The energy stored in spring 52 assists the drive for the yoke in overcoming at-rest inertia when the yoke is actuated.

In order to provide additional braking or cushioning, a secondary braking device 60 is provided. This device is interposed between the rear of lever 50 and bale case 10. It comprises a slider member 61 pivotally connected at 62 to lever 50 and having its opposite end slidably between a pair of flat friction members 64 and 65. Member 64 is connected by rivets 66 to the inside face of a channel member 68 in which slider 61 is movable. Member 68 is pivotally connected at 69 to ears 32 on the side of the bale case.

Surrounding channel member 68 is a bell-shaped housing 70 (FIG. 8) having side walls 71—71' and end walls 72—72'. The side walls 71—71' abut against the side edges of channel 68. Adjustable relative to housing 70 is a plate 74 on which friction member 65 is carried, being connected to the plate by rivets 75. Extending from the side of plate 74 opposite friction member 65 is a pin 76 which extends through end 72' of the housing 70. Interposed between end 72' and plate 74 is a coil-spring 78 which urges plate 74 and the friction member 65 carried thereon toward slider 61. The adjustment of spring 78 to thereby adjust the friction force on slider 61 is obtained by means of an adjustment screw 80 which is threaded through end 72 and engages channel 68. It will be readily apparent from FIG. 8 that on adjustment of screw 80, the compression of spring 78 is either increased or decreased, depending upon the direction of rotation of the adjustment screw.

Device 60 cooperates with the spring 52 in absorbing the kinetic energy of the needle yoke as it returns from a working stroke, friction members 64 and 65 resisting movement of slider 61 between them. The force of spring 52 must be such that it is greater than the friction force on slider 61 exerted by device 60. This is so that when the needle yoke operates to project wires across the bale case, spring 52 will pivot lever 50 counterclockwise against the resistance of the friction device, moving the lever into proper position for engagement with the bight 19 of the needle yoke when the needle yoke returns. The friction brake 60 has the additional advantage that the needle yoke, when starting its movement towards the bale chamber, is not over-affected by the spring 52 which might be the case if the lever and spring is used without the friction device.

While this invention has been described in connection with two embodiments thereof, it will be understood that it is capable of further modification, and this application is intended to cover any variations, usages, or adaptations of the invention following, in general, the principles of the invention and including such departures from the present disclosure as come within known or customary practice in the art to which the invention pertains and as fall within the scope of the invention or the limits of the appended claims.

Having thus described our invention, what we claim is:

1. An improvement in a hay baler having a bale case, a yoke straddling said bale case and pivotally connected thereto, said yoke having a bight at one side of said bale case on which needle means is carried and having a position of rest wherein said needle means is disposed at one side of said bale case, means for pivoting said yoke in one direction to an operative position wherein said needle means projects through said bale case and then pivoting the yoke in the opposite direction to return it to said position of rest, said bight of said yoke when pivoting in either direction moving in a given path, and means for braking the return of said yoke, the improvement residing in said braking means and comprising, in combination, a lever pivotally connected to said bale case and extending outwardly therefrom and into said path of movement of said bight, spring means biasing said lever in a direction opposite to the pivoting of said bight on a return stroke, stop means limiting pivotal movement of said lever by said biasing means whereby when said yoke is in said operative position said bight and lever are separated from each other, the pivot for said lever being so located that when the lever is engaged by the bight on a return stroke of the yoke and the lever is pivoted there is relative movement between the yoke and the lever, and a friction braking device connected between said lever and said bale case and resisting pivotal movement of said lever relative to the bale case.

2. An improvement in a hay baler as recited in claim 1 wherein said friction device comprises a slider member having an end pivotally connected to said lever and an end opposite said one end slidable between a pair of friction members, and means supporting said friction members on said bale case.

3. An improvement in a hay baler as recited in claim 2 wherein spring means is provided for urging one of said friction members toward the other member, and means for supporting said other member for adjustment toward and away from said one member.

4. In a hay baler, a bale case, needle means movable from one side of said bale case to an opposit side thereof and return, means for driving said needle means, and means for braking the return of said needle means comprising, in combination, interconnected cooperative primary and secondary braking devices, means mounting said primary braking device in a normal position on said bale case for engagement by said needle means at a given point during a return stroke of the needle means and being movable from said normal position responsive to such engagement, said primary braking device including means biasing the device toward said normal position, said secondary braking device being connected between said bale case and said primary braking device and being actuated responsive to movement of the primary braking device, said secondary braking device yieldably resisting return of said primary braking device to said normal position by said biasing means, and means for varying the braking effect of said second braking device.

References Cited in the file of this patent

UNITED STATES PATENTS

| | | |
|---|---|---|
| 2,030,031 | Innes | Feb. 4, 1936 |
| 2,403,396 | Ranney | July 2, 1946 |
| 2,618,494 | Guzzi | Nov. 18, 1952 |
| 2,750,877 | Nolt | June 19, 1956 |
| 2,766,684 | Newmaster | Oct. 16, 1956 |
| 2,781,719 | Hedtke | Feb. 19, 1957 |